US010129753B2

(12) United States Patent
Näslund et al.

(10) Patent No.: US 10,129,753 B2
(45) Date of Patent: Nov. 13, 2018

(54) METHODS AND ARRANGEMENTS FOR AUTHENTICATING A COMMUNICATION DEVICE

(71) Applicant: TELEFONAKTIEBOLAGET LM ERICSSON (publ), Stockholm (SE)

(72) Inventors: Mats Näslund, Bromma (SE); Elena Dubrova, Sollentuna (SE); Karl Norrman, Stockholm (SE); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 15/023,115

(22) PCT Filed: Dec. 7, 2015

(86) PCT No.: PCT/SE2015/051314
§ 371 (c)(1),
(2) Date: Mar. 18, 2016

(87) PCT Pub. No.: WO2017/099641
PCT Pub. Date: Jun. 15, 2017

(65) Prior Publication Data
US 2017/0164200 A1 Jun. 8, 2017

(51) Int. Cl.
G06F 21/00 (2013.01)
H04W 12/08 (2009.01)
(Continued)

(52) U.S. Cl.
CPC .......... H04W 12/08 (2013.01); H04L 9/3242 (2013.01); H04L 61/203 (2013.01);
(Continued)

(58) Field of Classification Search
CPC ..... H04W 12/08; H04W 12/10; H04W 12/06; H04W 12/02; H04W 84/042;
(Continued)

(56) References Cited

U.S. PATENT DOCUMENTS

2007/0101406 A1* 5/2007 Zavalkovsky ...... H04L 63/0815
726/4
2008/0026724 A1 1/2008 Zhang
(Continued)

OTHER PUBLICATIONS

International Search Report and Written Opinion dated Aug. 16, 2016 in International application No. PCT/SE2015/051314, 12 pages.

Primary Examiner — Morshed Mehedi
(74) Attorney, Agent, or Firm — Rothwell, Figg, Ernst & Manbeck, P.C.

(57) ABSTRACT

A method and arrangements for enabling authentication of a communication device is suggested, where a network node, capable of operating as an authentication server does not have to store all state related information relevant for a roundtrip of an authentication session. Instead of storing all this information, at least a part of it is provided to the authenticator or the communication unit, for later retrieval in a subsequent response. Based on the state related information provided in the response, the network node is capable of reproducing a state associated with a respective roundtrip. By repeating the mentioned process for a required number of roundtrips, an authentication session can be executed, where less state related information need to be stored at the mentioned network node.

20 Claims, 11 Drawing Sheets

(51) Int. Cl.
*H04L 9/32* (2006.01)
*H04L 29/06* (2006.01)
*H04W 12/02* (2009.01)
*H04W 12/10* (2009.01)
*H04W 12/06* (2009.01)
*H04L 29/12* (2006.01)
*H04W 84/04* (2009.01)

(52) U.S. Cl.
CPC ...... *H04L 63/0428* (2013.01); *H04L 63/0892* (2013.01); *H04W 12/02* (2013.01); *H04W 12/06* (2013.01); *H04W 12/10* (2013.01); *H04L 2209/80* (2013.01); *H04L 2209/84* (2013.01); *H04W 84/042* (2013.01)

(58) Field of Classification Search
CPC ............... H04L 9/3242; H04L 63/0428; H04L 63/0892; H04L 61/203; H04L 2209/84; H04L 2209/80
See application file for complete search history.

(56) References Cited

U.S. PATENT DOCUMENTS

| | | | |
|---|---|---|---|
| 2010/0017603 A1* | 1/2010 | Jones | H04L 9/0844 |
| | | | 713/168 |
| 2011/0202989 A1* | 8/2011 | Otranen | H04L 63/0815 |
| | | | 726/8 |
| 2012/0196638 A1 | 8/2012 | Wu et al. | |
| 2015/0121071 A1* | 4/2015 | Schwarz | H04L 63/08 |
| | | | 713/168 |
| 2017/0118026 A1* | 4/2017 | Yao | H04W 12/04 |

* cited by examiner

METHODS AND ARRANGEMENTS FOR AUTHENTICATING A COMMUNICATION DEVICE

CROSS REFERENCE TO RELATED APPLICATION

This application is a 35 U.S.C. 371 National Phase Entry Application from PCT/SE2015/051314, filed Dec. 7, 2015, the disclosure of which is incorporated by reference in its entirety.

TECHNICAL FIELD

The present disclosure relates to methods and arrangements for authenticating a communication device.

BACKGROUND

Current models for network/service authentication and authorization are often based on a three-entity model comprising: a client, being the entity one wishes to authenticate, in some contexts also referred to as "peer" or "supplicant"; an authenticator, capable of taking a decision whether to accept an authentication and authorize resource usage, and a back-end authentication server, maintaining credentials and other authentication-essential information related to the client. Sometimes, the authenticator and authentication server may be co-located. However, in a network serving a large number of clients, it will often be preferable to have one or more separate back-end authentication servers, rather than an architecture which has to handle the client's individual requests at the network access points, or attachment points. By way of example, in the latter example, implementation of specifics of an applied authentication method can be placed in the back-end authentication servers, and in the client, only, thereby obtaining a higher level of flexibility and security, while reducing the amount of functionality in the serving network, e.g. in the authenticator. In such situations, the authenticator is sometimes referred to as an "AAA client", not to be confused with the client being authenticated (as previously mentioned also referred to as supplicant or peer). Most of the back-end authentication servers used today provides a complete range of functions with respect to Authentication, Authorization and Accounting (AAA) within a single server. Concrete examples of servers providing the mentioned functionality include Home Location Register and Authentication Centers (HLR/AuC), used in 2G/3G networks; Home Subscriber Servers (HSS), used in 4G networks, supporting 2G/3G/4G Authentication and Key Agreement (AKA) protocols, as well as general purpose AAA servers, supporting the Extensible Authentication Protocol (EAP), or any other authentication protocol. It should be noted though that in current 2G/3G/4G networks, the predominant way to authenticate clients, comprised in communication devices, is through the use of Subscriber Identity Module/Universal Subscriber Identity Module (SIM/USIM) applications on Universal Integrated Circuit Card (UICC). While the database functionality is placed in the HLR/AuC or HSS back-end, the serving network (VLR/MSC, SGSN or MME) is nevertheless not transparent to all details of the authentication protocol. In EAP-based architectures, however, the serving network may often be made fully transparent also to such details.

For each access request, an authentication server needs to keep a state alive for the duration of an authentication period. This is necessary in order to ensure a sufficient level of security, e.g. for being able to withstand impersonation attempts and replay attacks, but it may also be necessary from a purely administrative point of view, e.g. for being able to map received responses to an earlier issued request message. The authentication server therefore needs to maintain the state during the complete protocol execution of the authentication procedure for a given client. By way of example, in a challenge response authentication protocol, the server sends a random challenge to the client. When the response to this challenge is received by the authentication server, the authentication server needs to verify that the response corresponds to the sent challenge. In order to be able to do that, the authentication server generally needs to store the challenge while waiting for the response.

In a typical 4G setting the authenticator, keeping the state during the authentication protocol execution, is the Mobility Management Entity (MME), while in a 5G or other setting one can instead envision that authentication will be performed, using the EAP. Reasons for this could for example be the additional flexibility and simplicity offered by allowing plural different authentication methods, while centralizing dependency on authentication specific details to a smaller number of backend servers. In the latter case, the entity maintaining state would no longer be the MME, but rather the HSS, or the $3^{rd}$ generation Partnership Project (3GPP) AAA server. The latter is presently used as the authentication server for enabling non-3GPP access to the Evolved Packet Core (EPC).

In a network, such as e.g. a 5G network, comprising a large number of peers, the number of authentication protocols simultaneously running on a given server, and hence, the number of states which the server need to keep, can grow prohibitively large.

Indeed, the scalability is a relevant problem not only for network authentication, but also for authentication related to other forms of service requests. Thus, in general, the requested service could be the connectivity/network access itself, but it could also be some higher layer application service, such as e.g. voice calls, IP multimedia communication services, access to a content, or gaming services, or, the like. Thus, the posed problem is applicable not only to more "pure" network access authentication scenarios, but also to application or service layer authentication, using e.g. ISIM, certificates, passwords, various security tokens, etc. In all of these situations, large scale systems may imply large state-storage requirements on the authentication server.

SUMMARY

It is an object of the present document to address, or at least alleviate the problem described above.

According to one aspect, a method in a network node, referred to as a first network node, for authenticating a communication device is suggested, where the method is initiated by recognizing reception of a message from another network node, referred to as a second network node, where the received message is initiating an authentication session for the communication device. Next, a roundtrip of the mentioned authentication session is initiated, where the roundtrip comprises a transmission of state related information to the second node, and where the state related information is indicative of the state of the first network node in association with execution of the ongoing roundtrip of the authentication session. Once the mentioned roundtrip has been initiated at least part of the state related information is deleted from storage, accessible to the first network node. Once reception of a response from the second network node is recognized, where the response is a response associated with the roundtrip of the authentication session and comprises the mentioned state related information, a recreation of at least part of the state is initiated, where the recreation is executed based on the received state related information. Finally, completion of the mentioned roundtrip of the authentication session is initiated, wherein the completion is based on the at least partly recreated state.

By applying the mentioned method the storage requirements on the network node, referred to as the first network node, will be reduced.

According to another aspect, a computer program for authenticating a communication device is suggested, where the computer program comprises computer program code which when executed by at least one processor of a first network node causes the first network node to perform the method as described above.

According to yet another aspect, a computer program product, comprising a computer program as mentioned above and a computer readable means on which the computer program is stored, is also suggested.

According to another aspect a method in a network node, referred to as a second network node, for participating in authentication of a communication device is suggested, where, initially, transmission of a first message to another network node, referred to as a first network node, is initiated, where the transmitted message is indicating initiation of an authentication session for the communication device. Next, reception of a second message, forming part of a roundtrip of the authentication session, from the first network node, is recognized, where the received second message comprise a request and state related information, and where the state related information is indicative of the state of the first network node during execution of the mentioned roundtrip. Forwarding of the request to the communication device is then initiated, after which reception of a first response associated with the roundtrip of the authentication session from the communication device is recognized. Finally, a second response is forwarded to the first network node wherein the second response comprises the first response and the mentioned state related information.

By executing the latter method, also the network node, referred to as the second network node will be able to contribute to the reduction of storage requirement in the network during an authentication procedure.

According to another aspect, a computer program for participating in authentication of a communication device is suggested, where the computer program comprises computer program code which when executed by at least one processor of a second network node causes the second network node to perform the latter method.

According to yet another aspect, a computer program product is suggested, which comprises a computer program, such as the one disclosed above, and a computer readable means on which the computer program is stored.

According to another aspect, a method in a communication device for being authenticated by a network node, referred to as a first network node, is suggested, where the method is initiated by recognizing reception of a request, received via another network node, referred to as a second network node, where the request is associated with a roundtrip of an authentication session for the communication device, and where the request comprises state related information, indicative of the state of the first network node during execution the roundtrip of the authentication session, and where the method is then initiating transmission of a response, associated with the roundtrip of the authentication session, to the first network node, via the second network node, wherein the response comprises the mentioned state related information.

By applying the latter method, a communication device will, according to one embodiment, be able to contribute to the reduction of storage requirements at the network, while according to another embodiment, where storage requirements are moved from the first node to the second node as mentioned above. In the latter situation, no modifications will be required to the communication devices.

According to another aspect, a computer program for authenticating a communication device is suggested, where the computer program comprises computer program code which when executed by at least one processor of a first network node causes the first network node to perform the latter method.

According to another embodiment, a computer program product, comprising a computer program as suggested above, and a computer readable means on which the computer program is stored, is suggested.

According to another aspect, a network node, referred to as a first network node, for authenticating a communication device is suggested, where a network node, referred to as the first network node, is configured to: recognize reception of a message from another network node, referred to as a second network node, where the message is initiating an authentication session for the communication device; initiate a roundtrip of the mentioned authentication session, where the roundtrip is comprising a transmission of state related information to the second network node, where the state related information is indicative of the state of the first network node in association with execution of the roundtrip of the authentication session; initiate deletion of at least part of the state related information from storage, accessible to the first network node; recognize reception of a response, associated with the roundtrip of the authentication session, from the second network node, where the response is comprising the mentioned state related information; initiate a recreation of at least part of the mentioned state, where the recreation is executed based on the mentioned received state related information, and initiate completion of the mentioned roundtrip of the authentication session, wherein the completion is based on the at least partly recreated state.

According to another embodiment, a network node, referred to as a first network node, for authenticating a communication device is suggested, where the first network node comprise a processor and a memory, where the mentioned memory comprise instructions, which when executed by the processor causes the first network node to: recognize reception of a message from another network node, referred to as a second network node, the message initiating an authentication session for the communication device; initiate a roundtrip of the mentioned authentication, comprising a transmission of state related information to the second node, where the mentioned state related information is indicative of the state of the first network node in association with execution of the roundtrip of the mentioned authentication session; initiate deletion of at least part of the state related information from storage, accessible to the first network node; recognize reception of a response, associated with the mentioned roundtrip of the mentioned authentication session, from the second network node, the response comprising the mentioned state related information; initiate a recreation of at least part of the mentioned state, the recreation being executed based on the received state related information, and initiate completion of the mentioned roundtrip of the mentioned authentication session, wherein the completion is based on the at least partly recreated state.

According to another aspect, a network node, referred to as a second network node, for participating in authentication of a communication device is suggested, where the second network node is configured to: initiate transmission of a first message to another network node, referred to as a first network node, the first message indicating initiation of an authentication session for the communication device; recognize reception of a second message, forming part of a roundtrip of the mentioned authentication session, from the first network node comprising a request and state related information, where the mentioned state related information is indicative of the state of the first network node during execution of the mentioned roundtrip; initiate forwarding of the request of the received second message to the communication device; recognize reception of a first response associated with the roundtrip of the authentication session from the communication device, and initiate forwarding of a second response to the first network node, wherein the second response comprises the first response and the state related information.

According to another embodiment, a network node, referred to as a second network node, for participating in authentication of a communication device is suggested, where the second network node comprise a processor and a memory, where the memory comprise instructions, which when executed by the processor causes the second network node to: initiate transmission of a first message to another network node, referred to as a first network node, the first message indicating initiation of an authentication session for the communication device; recognize reception of a second message, forming part of a roundtrip of the mentioned authentication session, from the first network node, comprising a request and state related information, where the mentioned state related information is indicative of the state of the first network node during execution of the mentioned roundtrip; initiate forwarding of the request of the received second message to the communication device; recognize reception of a first response, associated with the mentioned roundtrip of the authentication session, from the communication device, and initiate forwarding of a second response to the first network node, wherein the second response comprise the first response and the mentioned state related information.

According to another aspect, a communication device for being authenticated by a network node, referred to as a first network node, is suggested, where the communication device is configured to: recognize reception of a request, via another network node, referred to as a second network node, the request being associated with a roundtrip of an authentication session for the communication device, the request comprising state related information, indicative of the state of the first network node during execution of the mentioned roundtrip, and initiate transmission of a response, associated with the mentioned roundtrip of the mentioned authentication session, to the first network node, via the second network node, wherein the response comprises the mentioned state related information.

According to another embodiment, a communication device for being authenticated by a network node, referred to as a first network node, is suggested, where the communication device comprise a processor and a memory, where the memory comprise instructions, which when executed by the processor causes the second network node to: recognize reception of a request, via a second network node, the request being associated with a roundtrip of an authentication session for the communication device, said request comprising state related information, indicative of the state of the first network node during execution of said roundtrip, and initiate transmission of a response, associated with said roundtrip of said authentication session, to the first network node, via a second network node, wherein the response comprises said state related information.

While the network node referred to as a first network node above is typically also referred to as an authentication server, or another network node having corresponding functionality, the network node, referred to as a second network node is typically also referred to as an authenticator.

BRIEF DESCRIPTION OF DRAWINGS

Embodiments will now be described in more detail in relation to the accompanying drawings, in which.

DETAILED DESCRIPTION

Figure 1:
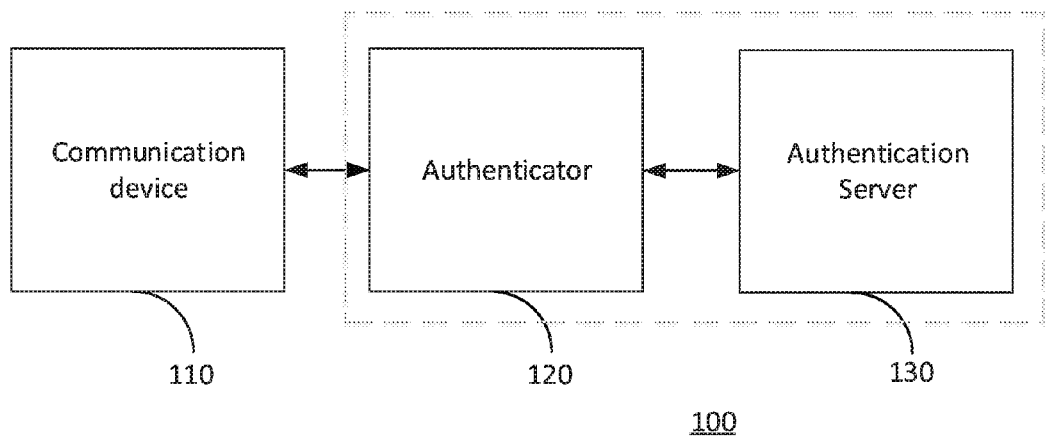
FIG. 1 is illustrating a simplified three-party authentication model, according to the prior art.

Generally, all terms used in the claims and examples as disclosed herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. Furthermore, the steps of any method disclosed herein do not have to be performed in the exact order disclosed, unless explicitly stated.

Briefly described, methods and arrangements are suggested herein which reduces, or even eliminates, the need for keeping and storing a state at an authentication server, or another network node comprising corresponding functionality, for the duration of an authentication session, process or procedure. A decreased need for storing content at an authentication server, in association with execution of an authentication process, is beneficial, particularly for networks giving access to a large number of clients/communication devices, where the accumulated number of states can grow prohibitively large and/or, where the frequency of re-authentications of the same client(s) is relatively high, e.g. due to a high security level desire.

Instead of storing a state at the authentication server, state related information is transmitted to an authenticator, participating in the authentication process, or to the client. When referring to state related information from herein after, it is to be understood that this information may refer to information representative of a specific category of state or part of a state for a given client, while other categories of states, and associated state related information, may be handled in a conventional way, or according to any alternative method or mechanism. Note that when we indicate "for a given client" it means that the described method or mechanism is typically applied on a per-client authentication session basis, which does not mean that only one client can be handled concurrently. On the contrary, in systems handling concurrent authentication sessions for plural clients, the disclosed invention is typically applied concurrently to each ongoing authentication session. For example, if B bytes of state related information can be saved per authentication session, then the disclosed mechanism will lead to N×B bytes of saved state related information in a system concurrently handling N clients. Thereby the methods suggested herein will typically be run in parallel for different clients.

Without loss of generality, an authentication session for a given client is defined by a sequence of request-response message pairs, where a request-response pair is denoted as a roundtrip. This authentication session is assumed to start by an initial request (typically, but not always, directed from the authenticator or authentication server toward the client). Such a message thus initiates an authentication session as disclosed herein. Note that depending on which entity one considers, the authentication session may start at different points of time. For example, if the first request is issued by the authenticator, from the server's point of view, the authentication session has not yet started since the authentication server may not even be aware of this. The start from the authentication server point of view (i.e. the point in time where the server would typically start to maintain state related information) may thus occur somewhat later. The authentication session is further assumed to finish with a final request, which can also often be seen as a "notification" directed from an authentication server/authenticator toward a client, where no further response from the client is expected. There are however exceptions, e.g. where the final message is directed from client to authentication server/authenticator. In the latter case, the authentication session may thus be viewed as terminating with a response message. Unless otherwise noted, whenever it is stated that an authentication session starts/is initialized or finishes/terminates, this is defined as seen from the authentication server's viewpoint. Two authentication sessions are thus considered (partly) concurrent (from the authentication server point of view) if there is a point in time at which both authentication sessions are initiated but neither is yet finished.

In a typical implementation, capable of executing an authentication session according to the prior art, an EAP and an Internet Engineering Task Force (IETF) standard authentication protocol are designed to run over data link layer protocols, such as e.g. the Point-to-Point Protocol (PPP), Institute of Electrical and Electronics Engineers (IEEE) 802.1X, or Ethernet. EAP is not providing a particular authentication mechanism/method, but a reliable framework for authentication. EAP can be seen as a general carrier for messages related to an authentication session, between an AAA enabled server and client, where only the client/server endpoints actually need to understand the details of how the authentication is actually performed, e.g. whether symmetric techniques, supported by SIM cards, USIM cards, or the like, or Public Key Infrastructure (PKI), is to be used, and, when applicable, how it is to be used. EAP follows the aforementioned request-response paradigm.

While various intermediaries may be involved in the authentication session as described herein, in addition to the client and the authentication server, these intermediaries are normally transparent to any details of the actual authentication process. In other words, EAP does not actually perform any authentication, but supports the entities to be authenticated so that they can negotiate as required, and provides an infrastructure for end points, allowing them to authenticate each other. EAP is becoming more and more popular, because of its flexibility in deploying various and newer authentication mechanisms and algorithms, without requiring any significant amendments of the entities involved in the authentication. EAP is e.g. used by 3GPP to "tunnel" USIM authentication mechanisms over a Wireless Local area Network (WLAN), as well as other non-3GPP access technologies.

An authentication process is typically involving both an authentication server and an authenticator. However, a simple two party authentication model comprise an authenticator, collocated with an AAA server, where the entity which requests authentication, typically referred to as the authenticator is also the entity which executes the specifics of the authentication method. Even though the technical solution disclosed herein is applicable also to such a model, the following examples and embodiments will focus on the three-party EAP authentication model 100, as illustrated in FIG. 1. The model comprises a communication device 110 comprising a client as described herein, adapted for the authentication mechanism described herein and connected to an authentication server 130, via an authenticator 120, but, a configuration may alternatively comprise a plurality of authenticators, to be handled by the one single authentication server 130.

In the present context, the communication device 110 comprises an edge device, also known as an access client, EAP peer, supplicant, or simply peer or client. The communication device 110 of FIG. 1 may be arranged as a part, comprising a client which is physically separated from the actual device, used by a user, or it may be integrated with that device. In 3GPP terminology the Edge Device forms part of a (UE) User Equipment which in the present context corresponds to the mentioned communication device. From herein after communication device is therefore to be construed as an entity comprising a client which is capable of participating in an authentication process with an authentication server, via an authenticator, or corresponding functionality, as described herein. In some cases, a UE/communication device may be viewed as also comprising an identity module (e.g. USIM on UICC card) and a Mobile Entity (ME), the latter comprising network communication means, user interface, general purpose processing/storage means, etc. The specifics of the authentication method may here be performed by the identity module only, or, be performed distributed between the identity module and the ME.

The communication device may also, alternatively be referred to as a mobile communication terminal, a Machine-to-Machine (M2M) device, a tablet/laptop with wireless of fixed mounted connectivity if configured to provide such functionality.

The authenticator 120, in the present context being an EAP authenticator, is an edge device that requires EAP authentication prior to granting the communication device 110 access to a network, or more in general, to some service. The authenticator 120, could typically be, or forming part of, a Mobility Management Entity (MME), a Network Access Server (NAS), an evolved Packet Data Gateway (ePDG), or an access point of a WLAN. For other types of services, the authenticator may reside in an application server or the like.

While the authenticator 120 participates in, and supports the authentication process performed by the authentication server 130, the authentication server 130 is the entity that actually authenticates clients, such as communication device 110. Specifically, the authentication server 130, validates credentials associated with the communication device 110 and, in case of successful authentication, authorizes the communication device 110 access to the network. In other cases, the authentication server 130 may mainly/only perform the authentication whereas the actual authorization decision lies at least partly with the authenticator, based on the results of the executed authentication. The authentication server 130 typically operates as an AAA server, and can be configured e.g. as a Remote Authentication Dial-In User Services (RADIUS), or a Diameter-based server. Typically the authentication server 130 is an EAP server, which is a server, capable of terminating an EAP authentication method and other EAP-related functions. Although EAP is given as an example, it is to be understood that the described mechanism is applicable also to other authentication models or methods.

In FIG. 1, the authenticator 120 requests the authentication server 130 to authenticate the communication device 110, upon initiation of a session by the communication device 110, rather than executing the authentication by itself, as would have been the case in a two-party authentication. In FIG. 1 the Communication device 110 may communicate with the authenticator 120 e.g. via an EAP over data link, while the authenticator 120 typically may communicate with the authenticator server 130, e.g. via the EAP over an AAA protocol, such as e.g. the aforementioned RADIUS or Diameter protocol.

The three-party model described in FIG. 1 is, as already mentioned, very useful in networks having a large number of peers, or communication devices, by applying one specific or different authentication methods. The latter case is believed to be commonly used in future networks, such as e.g. 5G networks.

When EAP is to be used by a communication device 110, during an authentication session, the use of a specific EAP authentication scheme, typically known as an EAP method, can be negotiated between the communication device 110 and the authenticator 120. Depending on which EAP method that is chosen, diverse plug-in modules (not shown), applicable for diverse authentication methods, will be possible to use. For simplicity it may be assumed that which authentication method to be used is already known (e.g. pre-configured) and thus focus is here on the authentication session related to performing that method. It can be noted though that if a negotiation is needed, requiring one or more roundtrips in which the server additionally needs to maintain a state, the method described herein may be applied also during such a negotiation.

Figure 2:
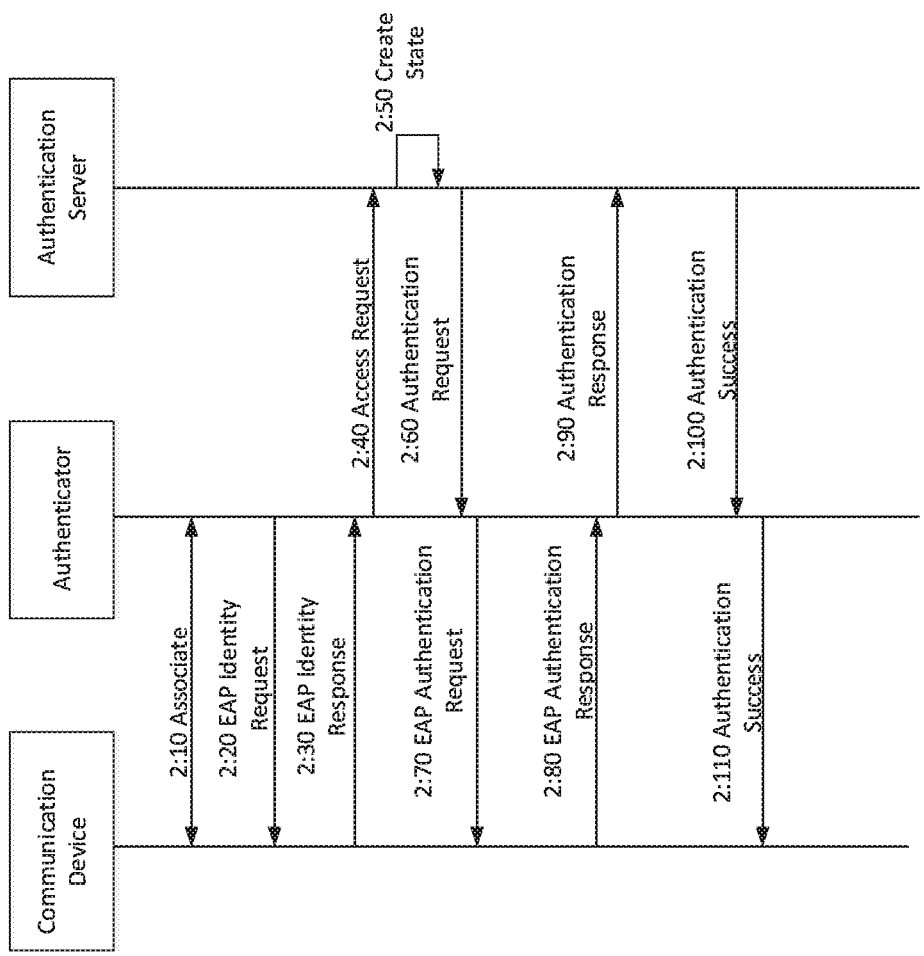
FIG. 2 is a signalling scheme, illustrating an authentication process, according to the prior art.

FIG. 2 is a signalling scheme, illustrating an EAP authentication session, according to the prior art. In a first step 2:10, a communication device requests connection to a network through an authenticator. The authenticator proceeds by initiating the EAP session by requesting an identity/credentials from the communication device in a subsequent step 2:20, after which the communication device responds with providing an identity/credentials, to the authenticator, as indicated with another step 2:30. The retrieved identity/credentials is/are then provided to an authentication server, typically via an AAA protocol, such as e.g. RADIUS or a Diameter protocol, as indicated in the access request of step 2:40. The authentication server then starts a process for validating the identity/credentials of the communication device, to determine whether the communication device is a recognized or accepted device which can be authenticated. If the identity/credentials is/are not recognized/accepted the authentication server may optionally issue a request for a new identity/credentials (not shown).

From the server point of view, the actual authentication session now starts and an initial authentication request is provided from the authentication server to the authenticator, as indicated with step 2:60, after a state has been created, as indicated with preceding, associated step 2:50. From the authentication server point of view, the initiated authentication session will later end with a final success (or failure), as indicated with step 2:110.

In FIG. 2, the authentication request of step 2:60 is forwarded to the communication device by the authenticator in step 2:70 and a response (authentication response) to the request is then provided from the communication device to the authenticator in a subsequent step 2:80, and from the authenticator to the authentication server in another step 2:90. Authentication success, in case of a successful authentication, is then reported (referred to as a notification in EAP terminology) from the authentication server to the authenticator, as indicated in step 2:100 and from the authenticator to the communication device, as indicated in a subsequent step 2:110.

Once authorized (e.g. by the authenticator), the communication device can be connected to the network (or other service) as requested. By using the type field of the mentioned request and response messages, it is possible to indicate the specific authentication method to be applied. Authentication, which can be applied together with the suggested mechanism, may include e.g. any of message digest (MD5)-challenge, one-time password, generic token card, Rivest-Shamir-Adleman (RSA) public key authentication, SIM, USIM or ISIM based authentication, and Transport Layer Security (TLS) for smart card and/or any other form of digital certificate-based authentication.

More specifically, what is suggested herein is an extension to be applied to a known authentication exchange procedure, such as e.g. the one described herein, in which an authentication server sends information related to a state, from hereinafter referred to as state related information. This information typically comprises information on the entire authentication session state associated with a given device/ client, to the authenticator and communication device, rather than being stored during the whole authentication process. Once the state has been sent by the authentication server, the authentication server can de-allocate, or actively delete the state from memory of the authentication server or of any other storage, accessible to the authentication server. The authenticator then includes the state related information into its next response to the authentication server, thereby enabling for the authentication server to reconstruct the state or relevant parts thereof as needed based on the retrieved state related information. The reconstruction could e.g. comprise copying received state related information into working memory in case the entire state is included in the state related information. Alternatively, the state related information may not include the entire state, but can, for instance, exclude information that can be deduced by the authentication server through other means. A concrete example of the latter scenario is that in case the authentication and key agreement procedure makes use of which PLMN ID the authenticator is located in, then this information could potentially be deduced by the authentication server based on a source identifier of the authenticator included in the message, transferring the state from the authenticator to the authentication server. During the described transferring of state related information, this information is typically secured, i.e. the transmitted state related information is communicated between the authentication server and the authenticator through a secure channel or by securing the data object, comprising the state related information, before transmission. If protocols, such as e.g. EAP and Diameter are used, one option is to include the state related information and associated protection information in EAP or Diameter attributes (AT). The option to include them in EAP attributes may, for protection purposes, be specifically advantageous in an alternative embodiment, as will be described later.

By eliminating the need to keep the state in the authentication server for the duration of the authentication process, the need for storing information at the authentication server for the duration of the authentication process can be reduced considerably. The latter advantage is more significant the larger the number of communication devices concurrently served by a network is.

Figure 3:
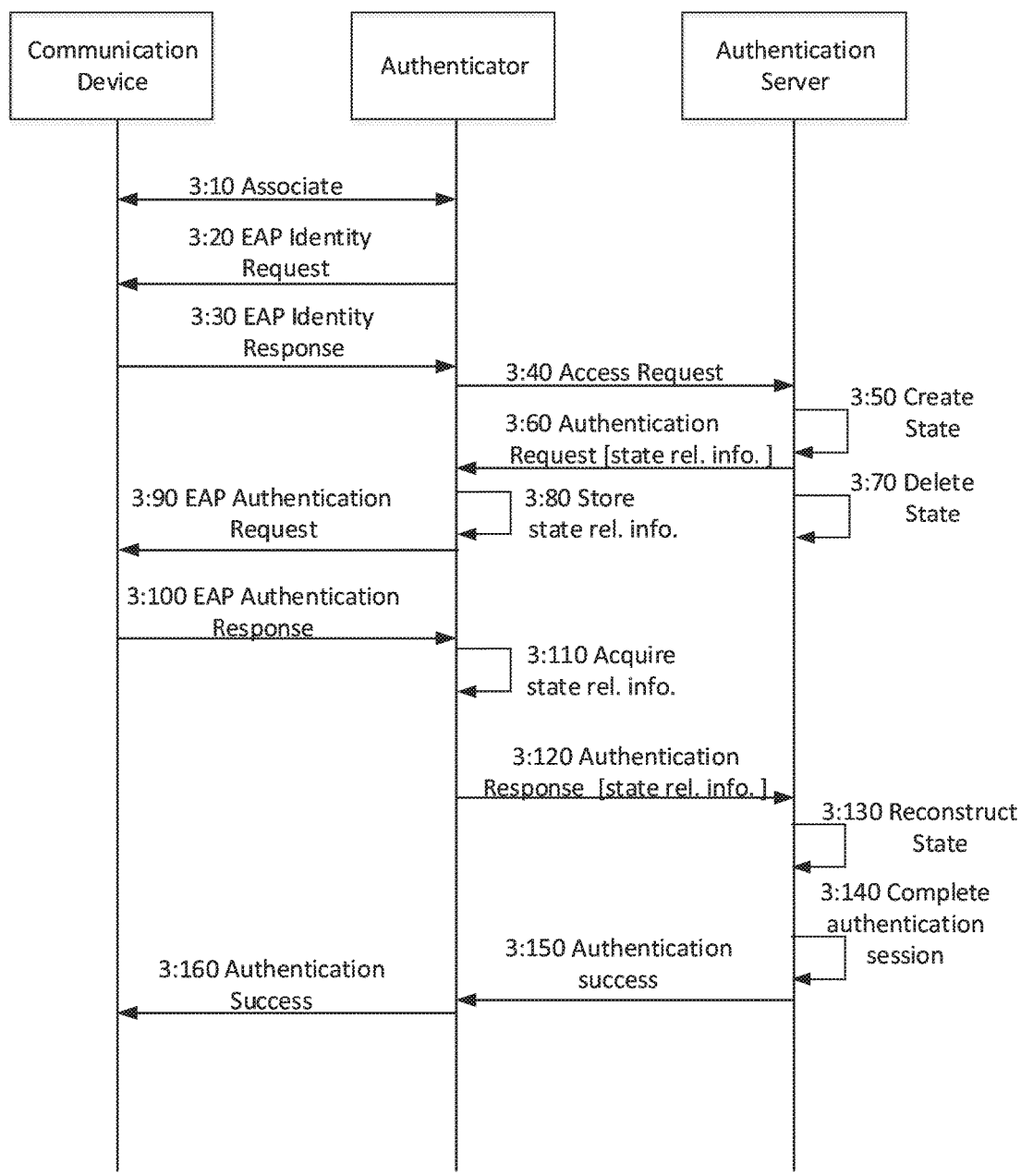
FIG. 3 is another signalling scheme, illustrating an authentication process, according to a first embodiment.

FIG. 3 is illustrating a signalling scheme where it is described how an authentication session, or at least one roundtrip of an authentication session, in case the authentication require multiple roundtrips, can be executed according to one embodiment, such that storing of some or all state related information at the authentication server, for the duration of the authentication process by the authentication server is no longer needed.

In FIG. 3, steps 3:10-3:50 are equivalent to the corresponding respective steps 2:10-2:50 of FIG. 2. However, according to the described embodiment, the authentication request, provided to the authenticator in step 3:60, now, in addition to information provided in known authentication sessions, also comprises state related information. By state related information, we here refer to information which, at a later stage, is sufficient for recreating the state, or at least part of the state, previously created by the authentication server at step 3:50, or any other entity connected to the authentication server. More specifically, the state related information may comprise e.g. one or more nonce, counters, sequence numbers, credentials, such as e.g. keys, or identifiers. As indicated with subsequent step 3:70, the state can be de-allocated or deleted once the state related information has been sent, or prepared to be sent, as indicated in step 3:60.

In another step 3:80 the state related information sent to the authenticator is stored by the authenticator, where the information is kept until later in the process, when it will again be needed.

In a subsequent step 3:90, which corresponds to step 2:70 of FIG. 2, an authentication request is sent from the authenticator to the communication device, after which the authentication device responds to the authenticator, with a step 3:100, corresponding to step 2:80 of FIG. 2. At this stage, previously stored state related information is acquired by the authenticator, as indicated with step 3:110, and in a subsequent step 3:120, an authentication response, this time comprising also the retrieved state related information, is provided from the authenticator to the authentication server. The exact mechanism by which the authenticator maintains, identifies and retrieves the correct state related information is outside the scope of the invention. To exemplify, the authenticator may use some identifier associated with the communication device (e.g. an IP or MAC address) and/or the authentication server. Thus, the authenticator would in step 3:80 store the state related information indexed by this identifier, and in conjunction with step 3:110, the authenticator would retrieve the same state related information from storage, using the same index. Once the state related information has been retrieved and forwarded in step 3:120, although not shown in the figure, the authenticator may thus de-allocate or delete the associated storage space used during steps 3:80 to 3:120 since it is no longer needed by the authenticator. The authentication server proceeds by reconstructing the previously created and deleted state, or part of that state, on the basis of the retrieved state related information, as indicated with step 3:130. Based on the recreated state, the authentication server is now able to complete the authentication session, in case the authentication session comprises only one roundtrip, as indicated with step 3:140. However, in case the authentication session requires more than one roundtrip, steps 3:50-3:130 are instead repeated for each required roundtrip, before execution of the process is completed by the authentication server, according to step 3:140. It is to be understood that in case of a plurality of roundtrips, different state related information may be dealt with at different roundtrips, where an instance of the state created at one roundtrip typically will depend, at least partly, on an instance of the state created at the preceding roundtrip.

Once an authentication session has been completed at step 3:140, a successful authentication may be signalled to the authenticator, as indicated with step 3:150. Alternatively, such a message also comprises authentication dependent key material to be used by the authenticator e.g. for protection (such as encryption) of subsequent communication with the communication device. The successful authentication may then be signalled to the communication device, as indicated with step 3:160.

While state related information is stored by the authenticator in the embodiment described above with reference to FIG. 3, FIG. 4 is describing an alternative embodiment, where instead the authenticator forwards state related information to the communication device, without itself storing this information. Such a procedure reduces the need to keep state related information even at the authenticator.

In general, one authentication server will need to handle connections to plural authenticators, each of which in turn is handling plural communication devices. For example, an authentication server connected to M authenticators, each serving N devices may, without the mechanism disclosed herein, imply a need to maintain/store states related to M×N concurrent sessions at the authentication server. By using a method as described thus far, the storage need is instead proportional to N, but at M different authenticators. Thus, while the storage needs of the server potentially suffer from the largest blow-up in terms of scale, the storage needs at the authenticator could still be quite large. By thus putting the storage requirement on the communication device, a minimal total amount of network-side storage need is possible and each communication device only needs to maintain information related to its own authentication session state.

Figure 4:
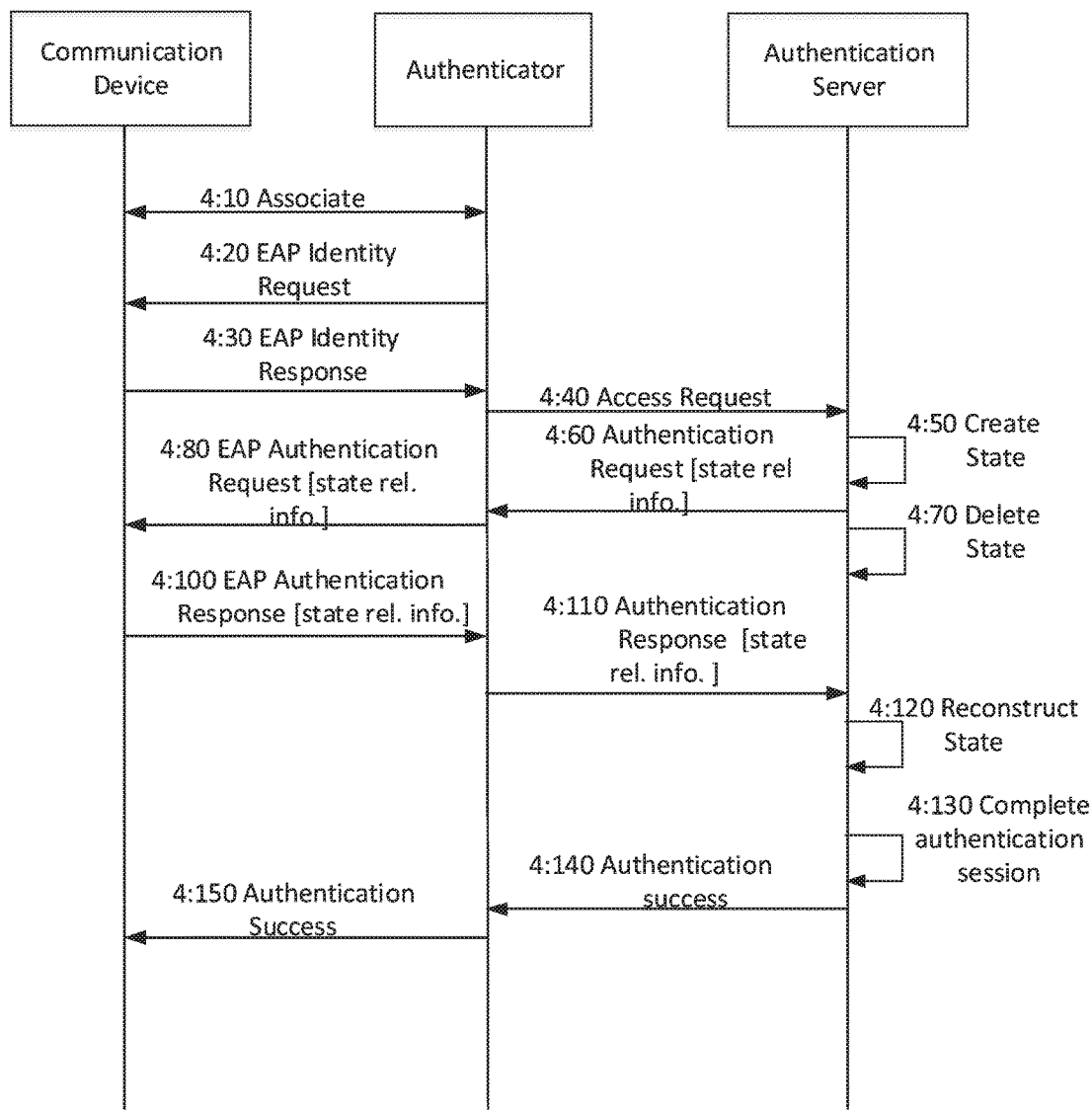
FIG. 4 is yet another signalling scheme, illustrating an authentication process, according to a second embodiment.

Again, steps 4:10-4:50 of FIG. 4 correspond to the first five steps of both FIGS. 2 and 3. In step 4:60, an authentication request is sent from the authentication server to the authenticator, wherein the request is provided with state related information which is sufficient for the authentication server to later be able to reconstruct the state, or part of the state, created in step 4:50, after which the authentication server can delete the created state, as indicated with step 4:70. However, as already mentioned above, instead of storing the state related information, the authenticator forwards the authentication request, comprising the state related information, to the communication device, as indicated with step 4:80. As indicated with another step 4:100, the communication device responds to the request by transmitting an authentication response, comprising the state related information, to the authenticator. At this stage the communication device will typically no longer need the state related information, and, thus, although not indicated in the figure, this information can now be deleted from storage of the communication device.

Again the authenticator forwards the authentication response, comprising the state related information, to the authentication server, as indicated with step 4:110, so that in a next step 4:120, the authentication server can reconstruct the state, or part of the state, previously created in step 4:50, and deleted in step 4:70, based on the received state related information. In resemblance to FIG. 3, the authentication server now can make use of the reconstructed state for completing the authentication session, as indicated in step 4:130, in case the authentication session comprise one roundtrip. In case the authentication session comprises a plurality of roundtrips, steps 4:50-4:120 will instead be repeated for each required roundtrip, before the authentication session can be completed accordingly. A successfully completed authentication session may result in signalling to the authenticator and the communication device, as indicated with steps 4:140 and 4:150, respectively, also in correspondence with corresponding steps 3:150 and 3:160, respectively, of FIG. 3.

Even though FIGS. 3 and 4 both refer to EAP related scenarios, it is to be understood that also other protocols may be applicable to the described procedure, as long as the basic principles of providing state related information in messages, rather than storing them at the authentication server, is applied.

It is also to be understood that the embodiments described with reference to FIGS. 3 and 4 focus on differences compared to prior art solutions, which are relevant for the understanding of the suggested methods and that also other information may be transmitted in the described steps, and thus any further steps, may be included in a real scenario, but which are not relevant for the described authentication process, have been omitted in the figures in order not to obscure the reader.

From RFC 6733, https://tools.ietf.org/html/rfc6733, referring to the Diameter protocol, it is known that Proxy-Info AVP (AVP Code 282), which is an Attribute-Value Pair (AVP) containing the identity and local state information of Diameter node, allows stateless agents to add a local state to a Diameter request, with the guarantee that the same state will be present in the answer. What is described in and before this paragraph can be referred to as a transport mechanism for state related information. However, in such a scenario, the protocols failover procedures still require that a copy of pending requests are maintained. It is also explicitly indicated in the mentioned RFC that the key management is out of the scope of that RFC, and thus, since key management is central to any authentication protocol, the mentioned RFC provides no means for removing state related information related to an authentication session, as is suggested in this document.

Figure 5:
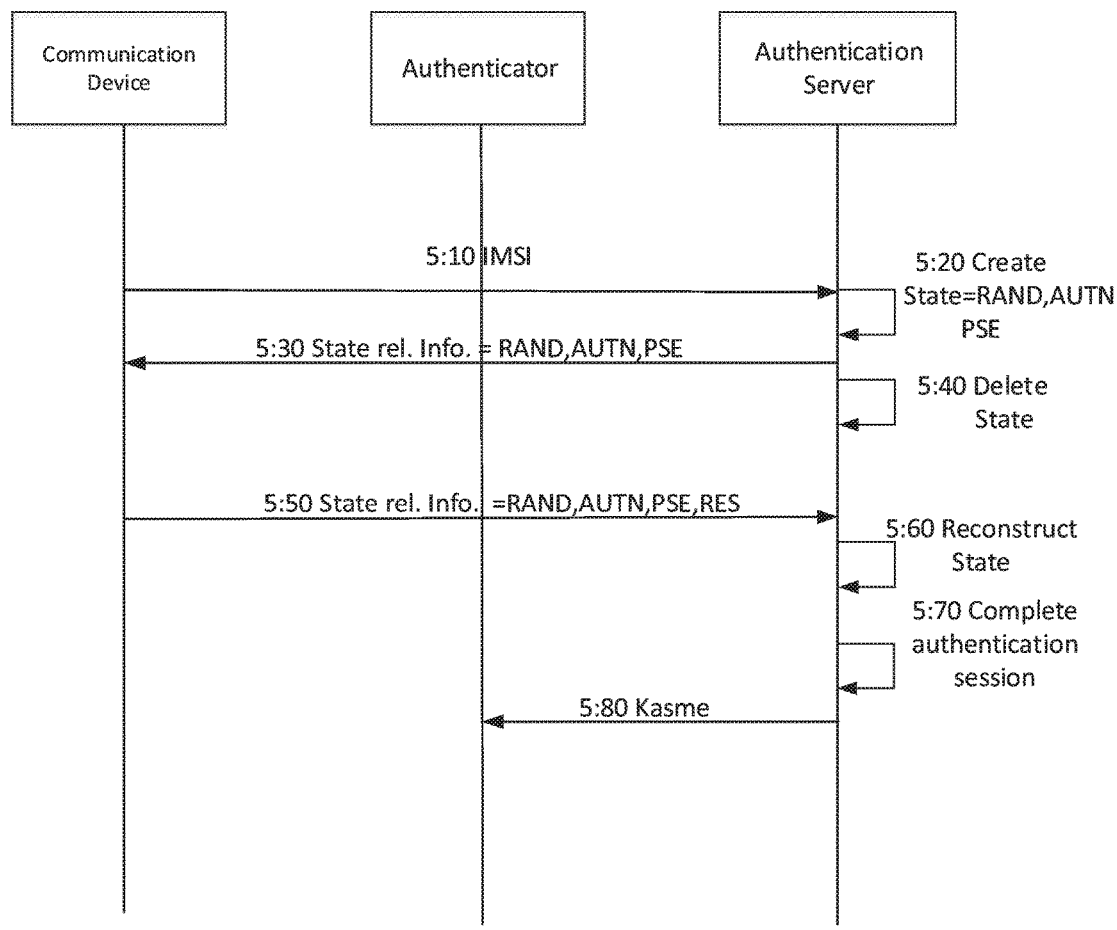
FIG. 5 is another signalling scheme, exemplifying the second embodiment mentioned above by applying an AKA authentication mechanism.

While FIGS. 3 and 4 describe the general principles for an authentication process where state related information is provided from an authentication server, according to two embodiments, FIG. 5 is describing a process which corresponds to the most central steps of the second embodiment described above as steps 4:40-4:140 with reference to FIG. 4, in the specific scenario where an (U)SIM based AKA authentication mechanism is applied. The described example may apply "native" AKA or tunnelling AKA inside EAP through the EAP-AKA method.

In a first step 5:10 of FIG. 5, an access request, represented by IMSI (International Mobile Subscribed Identity), is provided from the communication device to the authentication server, via the authenticator. In a next step 5:20, a state is created. In this embodiment, the state related information to be provided to the communication device comprises a random challenge (RAND) value and a sequence number, here referred to as SQN. In previous embodiments of the invention, the authentication server would typically need to authenticate (integrity protect) these values before sending them as part of the state related information, in order to prevent these from being modified by potential malicious entities, later resulting in reconstruct an incorrect state. Here we may however omit explicit authentication protection of the state related information by letting the authentication token (AUTN) be part of the state related information, where SQN is contained inside the AUTN. Through the definition of the AKA protocol, the AUTN itself already serves the purpose of authenticating RAND and SQN and thus, to authenticate the state related information. More in general, if EAP is used (regardless if it is EAP-AKA or some other method), by including the state related as new (or part of existing) EAP attributes, these attributes may be automatically protected by keys derived to protect the EAP session end-to-end between the authentication server and the communication device. In addition, a pseudonym, here referred to as PSE, can be included, so as to replace the IMSI in the signalling towards the communication device, thereby providing improved privacy protection to the user of the communication device.

In a next step 5:30, the 7:tate related information mentioned above is provided to the communication device via the authenticator, and in another step 5:40, the state can be deleted from storage at the authentication server.

In a next step 5:50, the communication device provides the state related information, together with an authentication response, referred to as RES, to the authentication server via the authenticator. Based on the provided information, the authentication server can now reconstruct the state, or part of the state, as indicated in step 5:60, and the authentication session can then be completed, as indicated with step 5:70. As a result of a successful authentication session, a security key Kasme is provided to the authenticator from the authentication server, as indicated in step 5:80.

Figure 6:
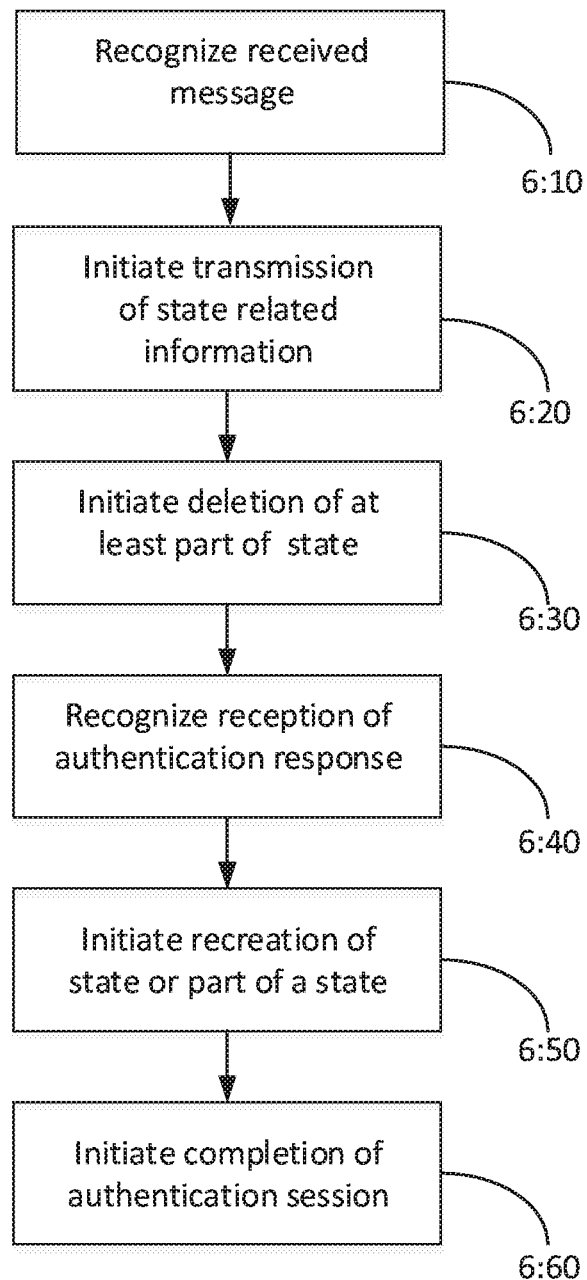
FIG. 6 is a flow chart, illustrating a method at a network node capable of operating as an authentication server, for authenticating a communication device/client.

In order to execute the authentication mechanism according to any of the embodiments disclosed above, the respective methods executed at an authentication server and an authenticator, respectively, need to be adapted accordingly. FIG. 6 is a flow chart, illustrating a method, executable at a network node capable of operating as an authentication server, such as the one described above, when used according to any of the scenarios described above with reference to any of FIGS. 3-5, either alone, or in cooperation with one or more additional entities.

As indicated in a first step 6:10 of FIG. 6, reception of a message, constituting an access request, from a communication device via a network node, from hereinafter referred to as an authenticator, is recognized by the authentication server. The authentication server determines, based on the access request, that an authentication of the communication device is required and for that purpose it initiates a roundtrip of an authentication session and creates a state, which, as already mentioned, is a state relevant for the mentioned roundtrip, followed by initiating transmission of state related information, associated with the created state, to the authenticator, as indicated with step 6:20.

Once the state related information has been transmitted to the authenticator, the authentication server initiates memory de-allocation, e.g. deletion, of at least part of the state, as indicated in step 6:30, thereby removing the need for storage of this state related information at the authentication server during the ongoing roundtrip of the authentication session.

As illustrated by step 6:40, the authentication server then recognizes reception of a response, which can be referred to as an authentication response, from the communication device to be authenticated, via the authenticator, where such a response comprises the mentioned state related information. In a next step 6:50, the authentication server initiates recreation of at least part of the state, based on the received state related information. Different parts of a state may e.g. be used in different roundtrips. As already mentioned above, in case the authentication session requires a plurality of roundtrips, steps 6:20-6:50 may be repeated a required number of times before completion of the authentication session can be initiated by the authentication server, as indicated with step 6:60. In the latter case state related information of a specific roundtrip will typically, at least to some extent, relate to state related information of a preceding roundtrip of the same authentication session.

As mentioned above, although not shown, a successful authentication session will typically be notified to the communication device by the authentication server, by transmitting a relevant notification to the communication device, via the authenticator, possibly together with other relevant key material. In case the communication device has kept state related information on behalf of the authentication server, the final notification may also be used as a trigger for the device to delete the state related information, since it is no longer needed.

Each of the actual execution of the steps, initiated as suggested above, may independently either be performed at the authentication server, or at another physical and/or logical entity, which is accessible to the authentication server. Corresponding reasoning is also applicable for the other flowcharts described below.

When the authentication server passes state related information to the authenticator there is a risk that the authenticator, or someone on the path to the authenticator, is a malicious one. Normally, the authentication server trusts the authenticator sufficiently for providing it with relevant key material etc., which may be needed for successful authentication, but the authenticator may not be completely trusted by the authentication server. By way of example, we may assume that the authentication server uses a successful authentication as evidence that a communication device truly were present in the network where the authenticator resides. The operator of the authentication server then only accepts to pay roaming charges to the serving network operator hosting the authenticator, in case an evidence of successful authentication of the communication device exists. In this case, the operator of the authenticator may be tempted to replay the state to the authentication server, at a later time and claim that the communication device was again present in the serving network, which would result in that the operator of the authentication server would have to pay additional roaming charges. To counter this and similar types of attacks, the authentication server may need to protect the state related information before it is sent to the authenticator. Such protection may comprise one or more of integrity protection, replay protection and confidentiality protection.

Confidentiality can be ensured by encrypting the state related information before transmission. Accordingly, the suggested method may provide protection of the state related information by initiation of encryption of at least part of the state related information, prior to initiating the transmission, e.g. by applying a secret key to the message. Correspondingly, decryption of at least part of received state related information is initiated, upon recognition of reception of a response from the communication device.

Integrity protection of the state related information can be accomplished by calculating a first Message Authentication Code (MAC) over at least part of the state related information for transmission of the MAC together with the state related information. When again receiving the state related information, the authentication server can verify a second MAC, received together with the state related information, thereby determining that the received state related information is correct.

Alternatively, or in addition to the optional features mentioned above, a mechanism for prohibiting replay can, according to one embodiment, be obtained by applying a counter, where the counter value is incremented each time the authentication server transmits state related information towards the authenticator. The value of the counter is attached to the state related information, and typically integrity protected by a MAC when sent to the authenticator, e.g. as suggested above. When the authentication server later receives the state related information from the authenticator, the server first verifies the MAC, if applied, and then determines whether the counter value has been previously received from the authenticator, or any other authenticator of the network. If the counter value has not been received previously, the authentication server continues processing, by re-establishing or recreating the state from the received state related information. However, if the authentication server concludes that the counter value has been used before, the authentication server will not recreate the state. The authentication server may or may not inform the authenticator of a failed authentication.

Whether or not the counter value has been received before can be determined in various ways. According to one embodiment, a received counter value is compared to the value of a second, locally kept counter, and if the received counter value is higher than the local value, it can be determined that received state related information is not replayed and the value of the second, locally kept counter can be set to the received counter value. Otherwise it is considered obvious that the counter value has been seen before and is a replay.

According to another embodiment, a replay cache is applied by the authentication server. Such a replay cache can be achieved by keeping a conceptual list of the most recently received responses and by marking which messages in the list have actually been received. Responses falling behind the list are considered old. When a response ahead of the list is received, the content of the list is shifted to include the newly arrived response as the first element in the list. Some of the responses at the end of the list may then be dropped. Thus, a sliding window mechanism is maintained.

According to one embodiment, a local counter is used commonly by a plurality of authenticators. A drawback with using a common counter is that if the counter is shared by a large number of authenticators, a large replay cache may be needed for handling re-ordered messages between the authentication server and the authenticators. Alternatively, a one counter-pair and a replay cache may be kept per authenticator. The latter approach will result in more, but smaller replay caches.

Any keys which may be used for integrity and/or confidentiality protection are out of the scope of this document, but a randomly generated key, kept locally by the authentication server, may be applied. It is to be understood that the only entity that will encrypt/decrypt and integrity protect state related information is the authentication server itself, and hence, no keys need to be established with any other parties in this respect. Moreover, a single key may be used to protect plural different state related information, associated to plural different communication devices.

The state related information is preferably also encrypted in order to ensure privacy for the communication device, typically by using a secret key of the authentication server. In addition, integrity protection can ensure that the authenticator has not changed its content, by using the key of the authentication server. Freshness can be ensured, e.g. by using a global counter at the authentication server, or by using a time stamp.

The above discussed protection measures for the state related information can of course be used also in those embodiments where the state related information is transferred to the communication device, rather than to the authenticator.

Figure 7:
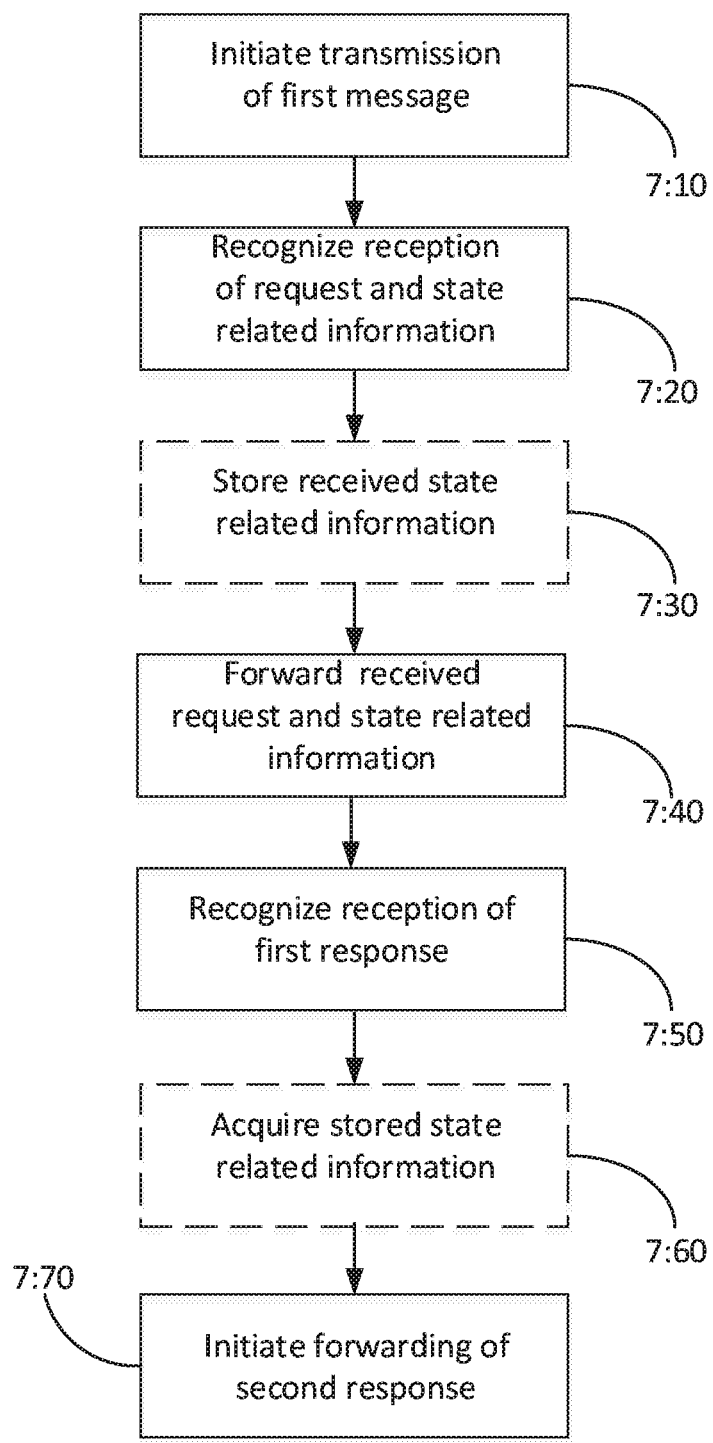
FIG. 7 is another flow chart, illustrating a method at a network node capable of operating as an authenticator, for participating in an authentication of a communication device/client.

FIG. 7 is another flow chart, illustrating a method executable in a network node, corresponding to the authenticator mentioned above, or any other network node, which is capable of participating in an authentication of a communication device, either alone, or in cooperation with one or more additional functional entity.

In a first step 7:10 of FIG. 7, the authenticator is initiating transmission of a first message to the authentication server, wherein the first message is indicating initiation of an authentication session for a communication device. In a next step 7:20, reception of a second message, forming part of a roundtrip of the authentication session, is recognized by the authenticator. The second message comprises a request and state related information which is indicative of the state of the authentication server during execution of an ongoing roundtrip of an authentication session. According to one embodiment, corresponding to the scenario described above with reference to FIG. 3, the authenticator initiates storage of the received state related information at storage of the authenticator or at storage accessible to the authenticator, as indicated with optional step 7:30. According to another embodiment, corresponding to the scenario described above, with reference to FIG. 4, forwarding of the request, together with the state related information, to the communication device in initiated by the authenticator, as indicated in a subsequent step 7:40.

In a next step 7:50, the authenticator recognizes reception of a first response, associated with the roundtrip of the authentication session, from the communication device. In case the state related information was stored in step 7:30, acquiring this information from the storage is now initiated, as indicated with optional step 7:60, and the authenticator initiates a forwarding of a second response to the authentication server, where the second response comprise the first response and the state related information, for further processing by the authentication server, as indicated with subsequent step 7:70. If, however, the response received in step 7:20 was instead forwarded with the state related information to the communication device in step 7:40, without storing it at the authenticator, the authentication response together with the state related information is instead forwarded from the communication device to the authentication server in step 7:70. In line with what has been mentioned above, steps 7:20-7:70 will be repeated for a number of roundtrips, if required by the applied authentication process.

Figure 8:
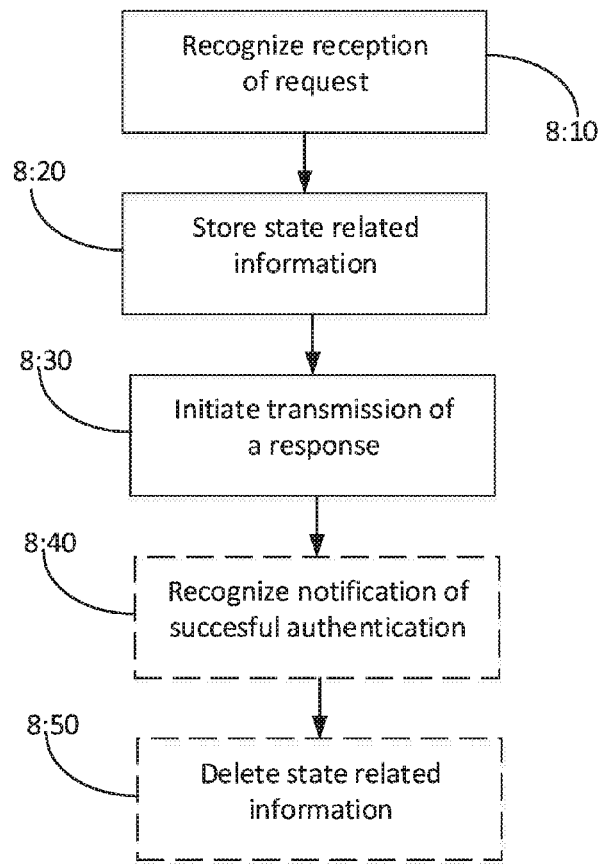
FIG. 8 is yet another flow chart, illustrating a method at a communication device being authenticated by network nodes, operating as an authenticator and an authentication server.

FIG. 8 is a flow chart illustrating a method as executed in a communication device, capable of requesting access to a service wherein authentication of the communication device is required as described herein, when applying the second embodiment as disclosed above. It is to be understood that when applying the first embodiment, communication devices will be able to operate in a conventional manner and thus will not require any adaptations therefore.

As indicated with a first step 8:10, the communication device recognizes reception of a request, received via an authenticator, the request being an authentication request, associated with a roundtrip of an authentication session for the communication device. As mentioned above, in the present embodiment this request comprises state related information, provided from the authentication server, and indicative of the state of the authentication server during execution of the roundtrip. The state related information is typically stored, at least temporarily, at the communication device, as indicated with optional step 8:20. The communication device responds by initiating a response, as indicated with step 8:30. The communication device may already at this point delete the state related information from storage if such information was contained in the authentication response at step 8:30. Alternatively, the communication device may keep the state related information in preparation for the possibility it is needed again in further roundtrips. In case the authentication server is configured to notify the communication device of a successful authentication, such a notification is recognized in another optional step 8:40, thereby enabling the communication device to delete any stored state related information, as indicated with another optional step 8:50.

Network nodes which are configured to operate as an authentication server and authenticator, respectively, either alone, or in cooperation with one or more additional entities, needs to be configured accordingly, so as to be able to support the suggested authentication mechanism.

According to one embodiment, a network node, here referred to as a first network node, capable of operating as an authentication server, authenticating a communication device, is disclosed, wherein the first network node is configured to recognize reception of a message from a second network node, capable of operating, as an authenticator, where the recognized message is initiating an authentication session for the communication device.

The first network node is also configured to initiate a roundtrip of the initiated authentication session, where the roundtrip comprises a transmission of state related information to the second network node, and where the state related information is information indicative of the state of the first network node in association with execution of the ongoing roundtrip of the authentication session. Once a roundtrip has been initiated, the first network node is configured to initiate a deletion of at least a part of the mentioned state related information from any storage where such information has been stored and which is accessible to the second network node. As already mentioned above, the state related information may comprise one or more of a nonce, a counter or sequence number, a key or an identifier.

The first network node is also configured to recognize reception of a response, associated with the ongoing roundtrip of the mentioned authentication session, and comprising the mentioned state related information, from the second network node. Using the recognized state related information, the first network node is configured to initiate a recreation of at least part of the mentioned state, and, once a sufficient part of the mentioned state has been recreated, the first network node is configured to make use of that part when initiating completion of the mentioned roundtrip of the authentication session.

As already mentioned above, an authentication session may comprise a plurality of successive roundtrips, where each roundtrip may make use of different state related information, where state related information considered during a specific roundtrip may, at least partly, relate to state related information provided in a previous roundtrip. In the latter case the first network node is configured to repeat the process mentioned above, by initiating a new roundtrip, until the authentication session has been successfully completed or it is determined to have failed.

Typically, the first network node is also configured to notify a communication device of a successful (or failed) authentication session by initiating transmission of a notification of a successful (or failed) authentication session to the communication device, via the second network node.

In order to enhance security and ensure confidentiality when transmitting the state related information, the first network node is also typically configured to initiate protection, such as encryption, of at least part of the state related information by applying a secret key to this information, before initiation of the transmission, and to initiate decryption of at least part of the received state related information upon recognizing reception of the response. Any type of known encryption/decryption algorithms may be used for the mentioned purpose.

In, addition, in order to also ensure integrity protection, a MAC based procedure may be applied. More specifically, the first network node may also be configured to initiate calculation of a MAC over at least a part of the applied state related information, before initiation of the transmission, to include the first MAC in the transmission, to recognize reception of a response and to verify initiation of a second MAC in the response, in dependence on at leat part of the received state related information, upon recognizing reception of the response.

The first communication device may be configured to enable replay protection, by way of handling one or more message replay lists/windows, message counters, sequence numbers or time stamps. However, since various ways of implementing any of the replay protection mechanisms mentioned above are already known in the art, details on how to determine the occurrence of replay has been omitted in this document.

In case a counter is applied, there are various ways for determining whether a received counter value has been seen before, and thus cannot be trusted. The first communication device may, according to one embodiment keep a local counter pair, used commonly for a plurality of network nodes, operating as authenticators. According to an alternative embodiment the first communication device is instead configured to keep a one counter-pair and replay cache per network node, operating as authenticator. While the former embodiment is less advantageous if a lot of authenticators are used, the latter embodiment results in more, but smaller replay caches.

Figure 10:
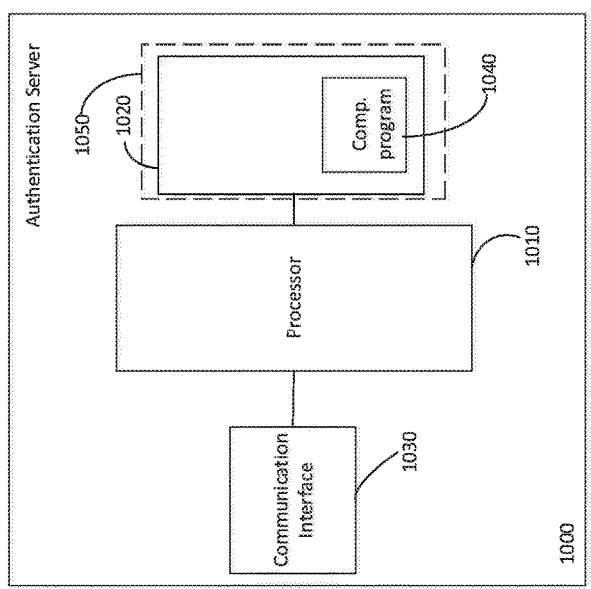
FIG. 10 is another block scheme, illustrating a network node, according to a second embodiment, where the network node is capable of operating as an authenticator server.

A first network node 1000, at least partly capable of operating as an authentication server, so as to authenticate a communication device, in accordance with what has been described above can, according to one embodiment be described as follows, with reference to FIG. 10. The first network node 1000 comprises a processor 1010 and a memory 1020, where the mentioned memory comprise instructions, or computer readable code, which when executed by the processor 1010 causes the first network node 1000 to operate according to any of the embodiments suggested above, and to perform all the steps previously mentioned with reference to FIG. 6. The memory 1020, as well as other memories, mentioned in this document can be any combination of read and write memory (RAM) and read only memory (ROM) and may also comprise persistent storage, which, e.g. can be any single one or combination of magnetic memory, optical memory, solid state memory or even remotely mounted memory.

Figure 9:
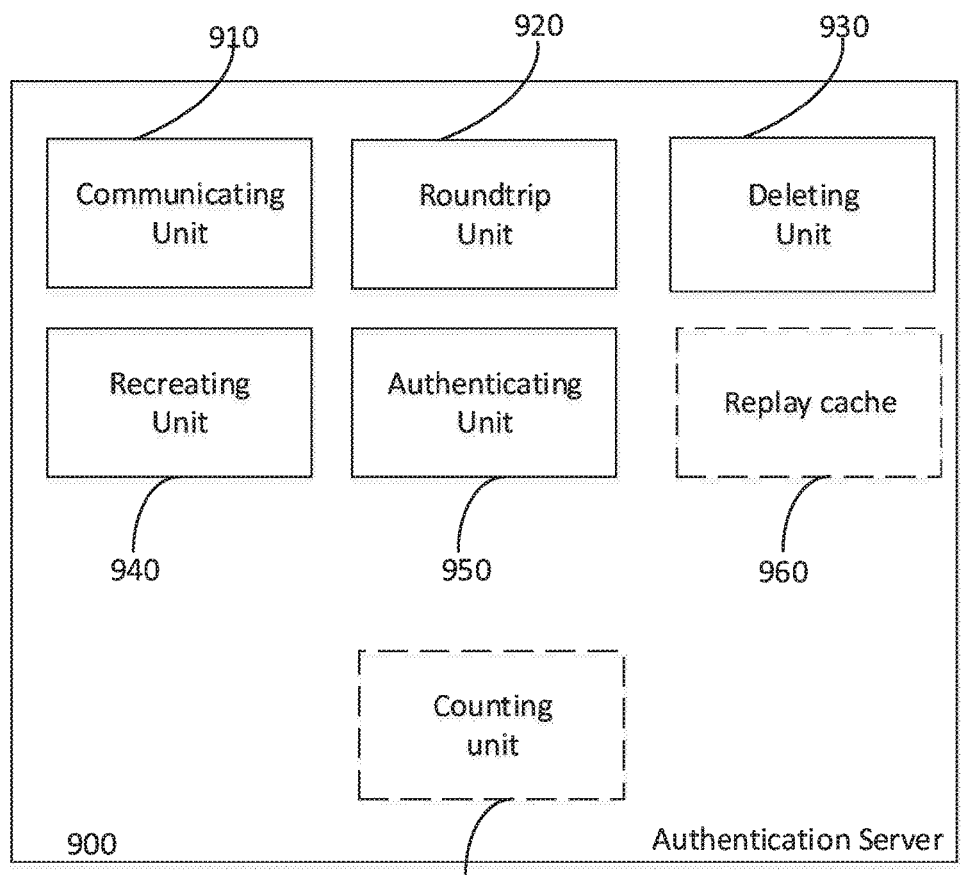
FIG. 9 is a block scheme, illustrating a network node, according to a first embodiment, where the network node is capable of operating as an authentication server.

A first network node 900, at least partly capable of operating as an authentication server, i.e. capable of operating as an authentication server alone or in combination with one or more additional entity, so as to authenticate a communication device, in accordance with what has been described above can, according to another embodiment be described as follows, with reference to FIG. 9. While the former embodiment described a software related implementation, the latter embodiment, refers to an embodiment which may be implemented as interacting software related modules, as interacting hardware related units, e.g. in the form of one or more Application-Specific Integrated Circuits (ASICs), or as a combination of software and hardware. Therefore, although all functional entities are referred to as functional units in FIG. 9, one or more of these units may instead be referred to, and configured, as modules.

More specifically, the first network node 900, comprises a communication unit 910, capable of recognizing a received message, corresponding to step 6:10 in FIG. 6, a roundtrip unit 920, capable of initiating a required roundtrip, via the communication unit 910, corresponding to step 6:20 in FIG. 6, a deleting unit, capable of deleting state related information no longer needed, corresponding to step 6:30 of FIG. 6, a recreating unit 940, capable of recognizing reception of a response, via the communication unit 910, corresponding to step 6:40 of FIG. 6, and of initiating recreation of a state, corresponding to step 6:50 of FIG. 6, and an authenticating unit 950, capable of initiating completion of an authentication session, i.e. of authenticating a communication device, upon determination of a successful authentication session, corresponding to step 6:60 of FIG. 6. The latter step may also include notifying the communication device of a successful authentication, via communication unit 910. Although only one communication unit is indicated in FIG. 6 and mentioned above, it is to be understood that the first communication unit 900 may alternatively comprise a plurality of communication units, each dedicated for a specific communication task of the communication tasks mentioned above. In case the first communication unit 900 is capable of providing confidentiality and/or integrity protection, the roundtrip unit 920 and the recreating unit 940 are also configured to provide the respective protection, according to any of the described embodiments. If applicable, the authentication server 900 may also comprise a replay cache 960 and/or a counting unit 970, to be used as suggested above.

An arrangement which is configured to operate as an authenticator, interacting with an authentication server, such as the one described above, either when arranged on a single network node, or distributed on a plurality of network nodes, will now be described in further detail below.

According to one embodiment, a network node, here referred to as a second network node, capable of operating, as an authenticator, authenticating a communication device when interacting with an authentication server, is disclosed. The second network node is configured to initiate a transmission of a first message to another network node, here referred to as a first network node, capable of operating as an authenticator, and to later recognize reception of a second message, forming part of a roundtrip of the mentioned authentication session, from the first network node, where the first message is indicating initiation of an authentication session for the communication device, and where the second message comprise a request and state related information, which is indicative of the state of the first network node during execution of the mentioned roundtrip.

The second network node is also configured to initiate forwarding of a the request, with or without the state related information, to the communication device, to recognize reception of a response associated with the roundtrip of the authentication session from the communication device, and to initiate forwarding of a second response, comprising the first response and the state related information, to the first network node.

In case more than one roundtrip is required for an authentication session, the second network node is also configured to repeatedly operate as indicated above, following recognition of a new roundtrip message from the first network node.

According to one embodiment, state related information received by the second network node is simply forwarded to the communication device, without requiring any handling by the second network node, while according to an alternative embodiment, the second network node is instead configured to store the received state related information in a storage accessible to the second network node, and only forward the request to the communication device, and, upon recognizing reception of response from the communication device, to acquire the stored state related information from the storage and to forward the authentication response together with the state related information to the first network node.

Figure 12:
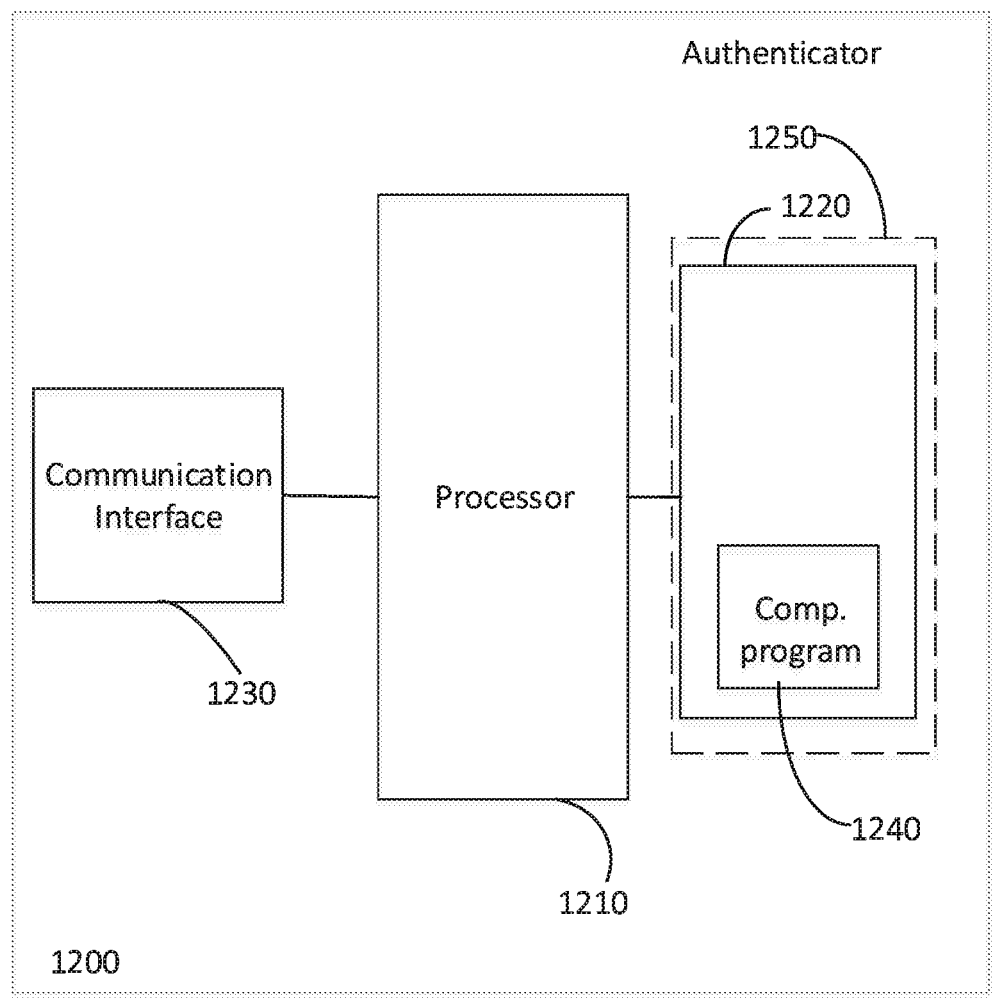
FIG. 12 is another block scheme, illustrating a network node, according to a second embodiment, where the network node is capable of operating as an authenticator.

A second network node 1200, capable of operating as an authenticator, alone or in combination with one or more entities, so as to participating in authentication of a communication device, in accordance with what has been described above can, according to one embodiment, be described as follows, with reference to FIG. 12. The second network node 1200 comprises a processor 1210 and a memory 1220, where the mentioned memory 1220 comprise instructions, or computer readable code, which when executed by the processor 1210 causes the second network node 1200 to operate according to any of the embodiments suggested above, and to perform all the steps previously mentioned with reference to FIG. 7.

Figure 11:
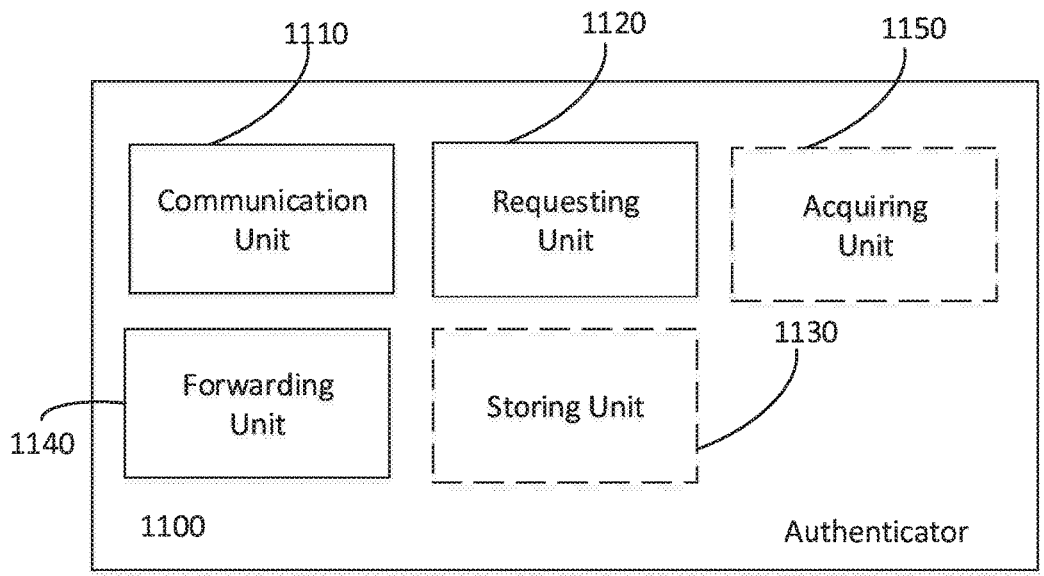
FIG. 11 is yet another block scheme, illustrating a network node, according to a first embodiment, where the network node is capable of operating as an authenticator.

A second network node 1100, at least partly capable of operating as an authenticator, so as to participate in an authentication of a communication device, in accordance with what has been described above can, according to an alternative embodiment be described as follows, with reference to FIG. 11. While the former embodiment described a software related implementation, the latter embodiment, according to FIG. 11, refers to an embodiment which may be implemented as interacting software related modules, as interacting hardware related units, e.g. in the form of one or more ASICS, or as a combination of software and hardware. Therefore, although all functional entities are referred to as units in FIG. 11, one or more of these units may instead be referred to, and configured, as modules.

More specifically, the second network node 1100, comprises a requesting unit 1120, configured to indicate initiation of an authentication session to a second network node, with a first message, corresponding to step 7:10 of FIG. 7, a communication unit 1110, configured to recognize reception of a second message from a first network node, where the second message is forming part of a roundtrip of the authentication session and comprise a request and state related information, corresponding to step 7:20 of FIG. 7. If the state related information provided in the second message is to be stored at the second network node, rather than simply being forwarded, a storing unit 1130 is configured for this purpose, corresponding to step 7:30 of FIG. 7. A forwarding unit 1140 is configured to forward the request of the received second message to the communication device, with or without state related information, depending on applied embodiment, corresponding to step 7:40 of FIG. 7, whereas, the communication unit 1110 is further configured to recognize reception of a first response, from the communication device, corresponding to step 7:50 of FIG. 7. Upon recognition, of the first response, if applicable, an acquiring unit 1150 is further configured to acquire the stored state related information from the storing unit 1130, corresponding to step 7:60 of FIG. 7, whereas, this information is simply forwarded to the first network node otherwise. In any event, the forwarding unit 1140 is configured to forward a second response, comprising the first response and the state related information, to the first network node, corresponding to step 7:70 of FIG. 7, thereby enabling the first network node to complete a respective roundtrip.

While the embodiment disclosed above, where the state related information is stored at and maintained with the authenticator, does not require any amendments to the communication devices requiring authentication, communication devices which are to be receiving and processing state related information need to be amended accordingly. A communication device, capable of operating in accordance with the latter embodiment will now be described in further detail below.

The communication device as described herein may be, or form part of any type of wireless, portable or stationary, device, such as e.g. a mobile phone, a lap top, a tablet, a TV, a wearable, or a M2M device, comprising a client, configured as described according to any of the suggested embodiments. The communication device may also be a device capable of communicating with an authentication server via an authenticator, according to any of the embodiments described herein, where the communication device is a wireless communication device connected to or comprising mobile phone functionality and/or any of the other functionalities mentioned above. Alternatively, a communication device may be configured as a stationary communication device, such as a telematics unit, embedded in or attachable to a vehicle, such as a car, truck, bus, boat, train, airplane and flying drone. The communication device may also be embedded in or attachable to a domestic appliance, such as in any type of white goods, a door lock, a surveillance and alarm equipment, an autonomous vacuum cleaner or grass cutter. The communication device may also be embedded in or attachable to a telematics unit for a robot and/or 3D printer used for industrial purposes or for domestic support functions. Other examples of where the communication device may be incorporated or added to is in public service equipment, such as street lamps, surveillance cameras, and entrance admittance equipment for public transport. The communication device may in other words be, or be implemented in, equipment which is able to utilize wireless connectivity to a communications network. Further examples of such communication devices are equipment used in healthcare and in payment terminals, e.g. payment terminals for credit cards.

Irrespective of the chosen configuration, the communication device comprises a client, enabling the communication device to interact with an authenticator and authentication server as suggested herein.

The communication device is configured to recognize reception of a request, received via a network node operating as an authenticator, where the request comprises state related information. The communication device is also configured to, at least temporary, store received state related information and to initiate transmission of a response, associated with the roundtrip towards the first network node, via the second network node, where the response comprises the state related information. Optionally, the communication device may also be configured to recognize a notification of the result from an authentication session, and, in case of a successful authentication, which can be interpreted by the communication device as an indication to delete or at least forget the stored state related information from storage of the communication device.

A communication device 1400, capable of being authenticated by a first network node, providing state related information, can, according to one embodiment, be described as follows, with reference to FIG. 14. The communication device 1400 comprises a processor 1410 and a memory 1420, where the mentioned memory 1420 comprise instructions, or computer readable code, which when executed by the processor 1410 causes the communication device 1400 to operate as suggested above and to perform the steps previously mentioned with reference to FIG. 8.

Figure 13:
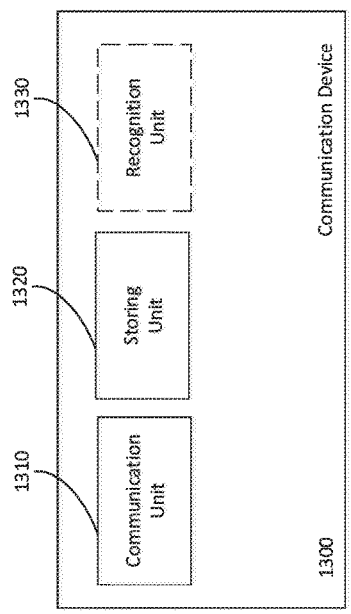
FIG. 13 is another block scheme, illustrating a communication device, according to a first embodiment, where the communication device is capable of participating in an authentication procedure of the same.

A communication device 1400, capable of being authenticated by a first network node, providing state related information, as suggested herein, can, according to an alternative embodiment be described as follows, with reference to FIG. 13. While the former embodiment described a software related implementation, the latter embodiment, according to FIG. 13 refers to an embodiment which may be implemented as interacting software related modules, as interacting hardware related units, e.g. in the form of one or more ASICS, or as a combination of software and hardware. Therefore, although the functional entity is referred to as a unit in FIG. 13, this unit may instead be referred to, and configured, as a module.

More specifically, the communication device 1300, comprises a communication unit 1310, configured to recognize a request, received via a network node, operating as an authenticator, hereinafter referred to as a first network node, as being a request associated with a roundtrip of an authentication session for the communication device, where the request is comprising state related information, indicative of the state of the first network node, corresponding to step 8:10 of FIG. 8, and to initiate transmission of a response, associated with the roundtrip of the authentication session, where the response is comprising state related information, to the first network node, corresponding to step 8:30 of FIG. 8. The communication device 1300 also comprise a storing unit 1320, for storing state relate information, corresponding to step 8:20 of FIG. 8. The communication unit 1310 may also comprise an optional recognition unit 1330, configured to recognize a notification of successful authentication, corresponding to optional step 8:40 of FIG. 8, whereas the storing unit 1320, if applied, is also configured to delete stored state related information, corresponding to step 8:50 of FIG. 8, in case a notification of a successful authentication is recognized by the communication device.

It is to be understood that each step referring to initialization, at respective network nodes, may imply that also the associated execution of the initiated event is executed at the same network node and even by the same functional unit or module as the one initiating the respective event. Alternatively, a respective execution, once initiated, may be executed at a connected, distributed network node.

The invention claimed is:

1. A method in a second network node for participating in authentication of a communication device, the method comprising:
   a) initiating transmission of a first message to a first network node, the first message indicating initiation of an authentication session for the communication device;
   b) recognizing reception of a second message transmitted by the first network node, the second message forming a first part of a roundtrip of said authentication session, and the second message comprising a request and the second message comprising state related information, wherein the first network node is unable to authenticate the communication device without said state related information;
   c) initiating forwarding of the request to the communication device;
   d) recognizing reception of a first response forming a second part of said roundtrip of said authentication session from the communication device, and
   e) initiating forwarding of a second response to the first network node, wherein the second response comprises the first response and said state related information, thereby enabling the first network node to use said state related information to authenticate the communication device without having to locally store said state related information.

2. The method according to claim 1, wherein steps b)-e) are repeated for at least one successive roundtrip.

3. The method according to claim 1, wherein the forwarding comprises also forwarding of the state related information.

4. The method according to claim 1, further comprising:
   after recognizing reception of said second message, the second network node storing said state related information in a storage accessible to the second network node; and
   as a result of recognizing reception of said first response forming said second part of said roundtrip of said authentication session, the second network node retrieving said state related information from the storage.

5. A computer program product, comprising a non-transitory computer readable medium, the non-transitory computer readable medium storing a computer program for participating in authentication of a communication device, the computer program comprising computer-executable instructions for causing a second network node to perform the steps recited in claim 1 when the computer-executable instructions are executed on a processor included in the first network node.

6. A method in a communication device for being authenticated by a first network node, the method comprising:
  receiving a request transmitted by a second network node, the request forming a first part of a roundtrip of an authentication session for the communication device, said roundtrip of an authentication session further having a second part, and said request comprising state related information, wherein the first network node is unable to authenticate the communication device without said state related information, and
  transmitting to the first network node via the second network node a response that is responsive to the request, the response forming said second part of said roundtrip of said authentication session, wherein the response comprises said state related information.

7. The method according to claim 6, wherein the mentioned steps are repeated for at least one successive roundtrip.

8. A computer program product, comprising a non-transitory computer readable medium, the non-transitory computer readable medium storing a computer program for authenticating a communication device by a first network node, the computer program comprising computer-executable instructions for causing the communication device to perform steps recited in claim 6 when the computer-executable instructions are executed on a processor included in the communication device.

9. A second network node for participating in authentication of a communication device, the second network node being configured to:
  a) initiate transmission of a first message to a first network node, the first message indicating initiation of an authentication session for the communication device;
  b) recognize reception of a second message transmitted by the first network node, the second message forming a first part of a roundtrip of said authentication session, the second message comprising a request and the second message comprising state related information, wherein without said state related information the first network node is unable to authenticate the communication device;
  c) initiate forwarding of the request of the received second message to the communication device;
  d) recognize reception of a first response forming a second part of said roundtrip of said authentication session from the communication device, and
  e) initiate forwarding of a second response to the first network node, wherein the second response comprises the first response and said state related information, thereby enabling the first network node to use said state related information to authenticate the communication device.

10. The second network node according to claim 9, configured to repeat executions according to b)-e) for at least one successive roundtrip.

11. The second network node according to claim 9, configured to forward the state related information together with the request.

12. The second network node according to claim 9, configured to store the state related information in a storage accessible to the second network node, upon recognizing reception of the second message, and for acquiring the stored state related information from the storage upon initiating forwarding of the authentication response.

13. A second network node for participating in authentication of a communication device, the second network node comprising a processor and a memory, said memory comprising instructions, which when executed by the processor causes the second network node to:
  a) initiate transmission of a first message to a first network node, the first message indicating initiation of an authentication session for the communication device;
  b) recognize reception of a second message transmitted by the first network node, the second message forming a first part of a roundtrip of said authentication session, and the second message comprising a request and the second message comprising state related information, wherein without said state related information the first network node is unable to authenticate the communication device;
  c) initiate forwarding of the request of the received second message to the communication device;
  d) recognize reception of a first response forming a second part of said roundtrip of said authentication session, from the communication device, and
  e) initiate forwarding of a second response to the first network node, wherein the second response comprise the first response and said state related information, thereby enabling the first network node to use said state related information to authenticate the communication device.

14. A communication device for being authenticated by a first network node, the communication device being configured to:
  receive a request transmitted by a second network node, the request forming a first part of a roundtrip of an authentication session for the communication device, said roundtrip of an authentication session further having a second part, and the request comprising state related information, wherein the first network node is unable to authenticate the communication device without said state related information; and
  transmit to the first network node via the second network node a response that is responsive to the request, the response forming said second part of said roundtrip of said authentication session, wherein the response comprises said state related information.

15. A communication device for being authenticated by a first network node the communication device comprising a processor and a memory, said memory comprising instructions, which when executed by the processor causes the first network node to:
  receive a request transmitted by a second network node, the request forming a first part of a roundtrip of an authentication session for the communication device, said roundtrip of an authentication session further having a second part, and said request comprising state related information, wherein the first network node is unable to authenticate the communication device without said state related information; and
  transmit to the first network node via the second network node a response that is responsive to the request, the response forming said second part of said roundtrip of said authentication session, wherein the response comprises said state related information.

16. The communication device according to claim 14, wherein the communication device is comprised in a vehicle.

17. The method of claim 1, wherein the state related information comprises one or more of:
a nonce,
a counter,
a sequence number, and
a key.

18. The method of claim 1, further comprising:
storing the state related information in association with one of an address of the communication device, wherein
the first response comprises the address, and
the method further comprises using the address included in the first response to retrieve the stored state related information.

19. The method of claim 18, wherein the address is one of an Internet Protocol (IP) address and a Media Access Control (MAC) address.

20. The method of claim 1, wherein the request comprises the state related information.

* * * * *

UNITED STATES PATENT AND TRADEMARK OFFICE
CERTIFICATE OF CORRECTION

| | |
|---|---|
| PATENT NO. | : 10,129,753 B2 |
| APPLICATION NO. | : 15/023115 |
| DATED | : November 13, 2018 |
| INVENTOR(S) | : Näslund et al. |

Page 1 of 1

It is certified that error appears in the above-identified patent and that said Letters Patent is hereby corrected as shown below:

In the Drawings

Fig. 8, Drawing Sheet 1 of 11, for Step "8:40", in Line 2, delete "succesful" and insert -- successful --, therefor.

Figure 14:
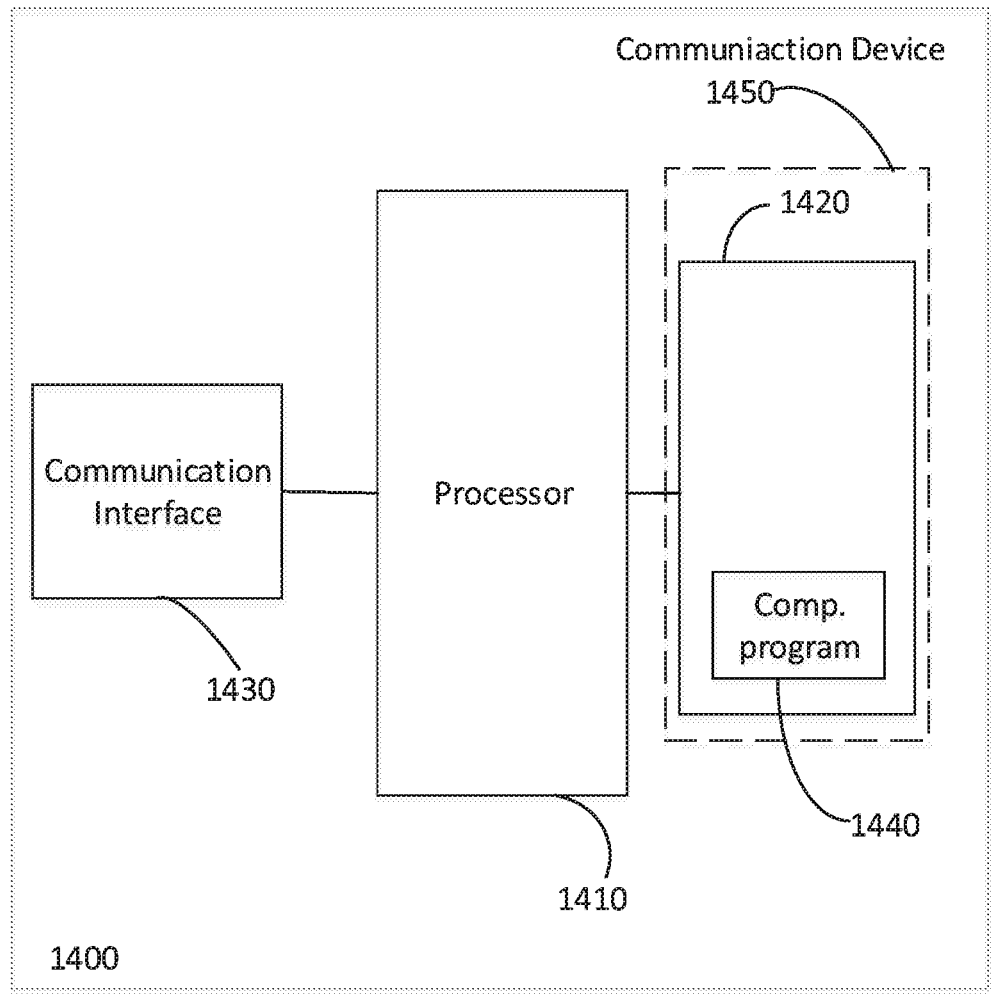
FIG. 14 is yet another block scheme, illustrating a communication device, according to a second embodiment, where the communication device is capable of participating in an authentication procedure of the same.

Fig. 14, Drawing Sheet 11 of 11, in Tag "1400", Line 1, delete "Communiaction" and insert -- Communication --, therefor.

In the Specification

Column 6, Line 45, delete "authenticator server." and insert -- authentication server. --, therefor.

Column 9, Line 53, delete "authenticator server" and insert -- authentication server --, therefor.

Column 14, Line 54, delete "7:tate" and insert -- state --, therefor.

Column 18, Line 3, delete "in initiated" and insert -- is initiated --, therefor.

Column 19, Line 60, delete "at leat" and insert -- at least --, therefor.

Column 20, Line 29, delete "read and write memory (RAM)" and insert -- read and write memory (RWM) --, therefor.

Column 21, Line 34, delete "a the request," and insert -- the request, --, therefor.

Column 22, Line 15, delete "ASICS," and insert -- ASICs, --, therefor.

Column 22, Line 60, delete "lap top," and insert -- laptop, --, therefor.

Column 23, Line 61, delete "ASICS," and insert -- ASICs, --, therefor.

Signed and Sealed this
Twenty-sixth Day of March, 2019

Andrei Iancu
*Director of the United States Patent and Trademark Office*